US011132919B2

(12) United States Patent
Dubé

(10) Patent No.: US 11,132,919 B2
(45) Date of Patent: Sep. 28, 2021

(54) SYSTEMS AND METHODS FOR REMOTELY OPERATED MACHINE TRAINING

(71) Applicant: CAE Inc., Saint-Laurent (CA)

(72) Inventor: Mario G. Dubé, Lorraine (CA)

(*) Notice: Subject to any disclaimer, the term of this patent is extended or adjusted under 35 U.S.C. 154(b) by 556 days.

(21) Appl. No.: 15/942,045

(22) Filed: Mar. 30, 2018

(65) Prior Publication Data

US 2019/0304333 A1  Oct. 3, 2019

(51) Int. Cl.
*G09B 19/00* (2006.01)
*G09B 9/00* (2006.01)
G09B 19/16 (2006.01)
G06F 3/0484 (2013.01)
G09B 9/04 (2006.01)
G09B 9/06 (2006.01)
G09B 9/08 (2006.01)
G09B 9/46 (2006.01)

(52) U.S. Cl.
CPC ............ *G09B 19/003* (2013.01); *G09B 9/00* (2013.01); *G06F 3/04847* (2013.01); *G09B 9/04* (2013.01); *G09B 9/063* (2013.01); *G09B 9/085* (2013.01); *G09B 9/46* (2013.01); *G09B 19/162* (2013.01); *G09B 19/165* (2013.01); *G09B 19/167* (2013.01)

(58) Field of Classification Search
None
See application file for complete search history.

(56) References Cited

U.S. PATENT DOCUMENTS

| 7,418,317 B2 * | 8/2008 | Cosgrove, Jr. ........ B64C 39/024 701/1 |
| 8,626,361 B2 | 1/2014 | Gerlock |
| 2007/0244608 A1 | 10/2007 | Rath et al. |
| 2009/0112388 A1 | 4/2009 | Yeager et al. |
| 2012/0221180 A1 | 8/2012 | Lee et al. |
| 2015/0336671 A1 | 11/2015 | Winn et al. |

FOREIGN PATENT DOCUMENTS

CN    102937800    2/2013

* cited by examiner

*Primary Examiner* — James B Hull
(74) *Attorney, Agent, or Firm* — Gowling WLG (Canada) LLP

(57) ABSTRACT

The present disclosure describes systems and methods for training a user to control one or more simulated remotely operated machines. A network stream definition language file is used to identify and process simulated remotely operated machine data exchanged between a simulation computing device and a plurality of simulation stations, possibly being defined by many different Interface Control Documents (ICDs). Any exchange of simulated remotely operated machine data between the simulation computing device and a simulation station passes through a protocol gateway that implements the network stream definition language file. The protocol gateway is located at any point of the communication between the simulation computing device and the simulation station. Because the network stream definition language file configures the protocol gateway to process data between the simulation computing device and the plurality of simulation stations, each potentially having respective proprietary ICDs, only a single protocol gateway is necessary within the system.

20 Claims, 4 Drawing Sheets

```
<xs:element name="NetworkStreamDefinition">
  <xs:complexType>
    <xs:sequence>
      <xs:element name="Enumeration_Seg" minOccurs="0" maxOccurs="unbounded">...</xs:element>
      <xs:element name="Structure_Segme" minOccurs="0" maxOccurs="unbounded">...</xs:element>
      <xs:element name="Header_Segment" minOccurs="0" maxOccurs="unbounded">...</xs:element>
      <xs:element name="Footer_Segment" minOccurs="0" maxOccurs="unbounded">...</xs:element>
      <xs:element name="XmlRoot_Segment" minOccurs="1" maxOccurs="1">...</xs:element>
      <xs:element name="OutgoingPacket" minOccurs="1" maxOccurs="unbounded">...</xs:element>
      <xs:element name="IncomingPacket" minOccurs="1" maxOccurs="unbounded">...</xs:element>
    </xs:sequence>
    <xs:attribute ref="Note" use="optional" />
    <xs:attribute ref="StreamType" use="optional"/>
    <xs:attribute ref="Epoch" use="optional" default="1970-01-01T00:00:00Z"/>
    <xs:attribute ref="MaximumNumberOfDataBlock" use="optional" default="1"/>
    <xs:attribute ref="ChecksumLocation" use="optional"/>
    <xs:attribute ref="ChecksumContext" use="optional" default="Packet"/>
    <xs:attribute ref="ChecksumMethod" use="optional" default="SUM_16"/>
    <xs:attribute ref="UpdateRateInHz" use="optional" default="1.0"/>
    <xs:attribute ref="UpdateIntervalInSec" use="optional" default="1.0"/>
  </xs:complexType>
</xs:element>
```

*FIG. 4*

SYSTEMS AND METHODS FOR REMOTELY OPERATED MACHINE TRAINING

TECHNICAL FIELD

The present disclosure relates to training for remotely operated machines, and in particular, to a data exchange infrastructure that enables training of a user for controlling remotely operated machines.

BACKGROUND

Operators of remotely operated machines develop specific skillsets that are quite unique. For instance, the remotely operated machine operators can typically rapidly transfer their skillsets from one type of remotely operated machine to another. Their skillsets may even be portable to other types of remotely operated machine (e.g., terrestrial or marine robots or vehicles, etc.). The operators still need training before approaching a specific type of remotely operated machine. One challenge faced by the operator is to master the specific instrumentation provided by the manufacturer of the remotely operated machine. Interactive computer simulation that provides actual instrumentation to the operator (i.e., same instrumentation as an actual remotely operated machine) is seen as the best method to achieve the necessary training efficiently.

In interactive computer simulations, the behavior of a specific type of remotely operated machine is simulated following a simulation model that is tailored for the specific type of remotely operated machine. There are similarities between the different simulation models, which are not typically based on identity of the remotely operated machine's manufacturer, but rather on the purpose of the machine (e.g., aerial recognition vs. demining robot). The simulation models are used by a simulation computing device to simulate the behavior of a given remotely operated machine based on commands received from an operator in training using the actual instrumentation. There may also be similarities in the "look and feel" of the actual instrumentation provided to the operator in training. However, the actual instrumentation provided by different manufacturers are specific and are not interfaced easily towards the simulation model.

The present invention addresses this shortcoming.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure describes a system for training a user in controlling one or more simulated remotely operated machines. The system comprises a communications network. The system also comprises a first simulation station comprising: an instrument module for a simulated remotely operated machine of a first type for converting control commands received from the user into digitized instructions; a Graphical User Interface (GUI) module for providing images related to the simulated remotely operated machine of the first type to the user; and a network interface module configured to exchange simulated remotely operated machine data for the remotely operated machine of the first type with a simulation computing device over the communications network, the simulated remotely operated machine data formatted in accordance with a first protocol defined by an Interface Control Document (ICD) specific to the first type of simulated remotely operated machine, the simulated remotely operated machine data comprising the digitized instructions. The system also comprises the simulation computing device, for simulating behavior of the remotely operated machine of the first type considering the digitized instructions from the first simulation station, comprising: a processor module that computes the images related to the simulated remotely operated machine of the first type considering the digitized instructions; and a network interface module configured to exchange the simulated remotely operated machine data for the simulated remotely operated machine of the first type with the first simulation station over the communications network in accordance with a universal protocol defined by a universal ICD, the simulated remotely operated machine data comprising the computed images. The system also comprises a protocol gateway located between the first simulation station and the simulation computing device, the protocol gateway implementing a network stream definition language file that configures the protocol gateway to: when receiving the simulated remotely operated machine data from the simulation station via the first protocol, processing the simulated remotely operated machine data in accordance with the universal ICD and transmitting the processed simulated remotely operated machine data to the simulation computing device via the universal protocol; when receiving the simulated remotely operated machine data from the simulation computing device via the universal protocol, processing the simulated remotely operated machine data in accordance with the first protocol and transmitting the processed simulated remotely operated machine data to the simulation station via the first protocol.

The system may further comprise a second simulation station comprising: an instrument module for a simulated remotely operated machine of a second type for converting control commands received from the user into digitized instructions; a GUI module for providing images related to the simulated remotely operated machine of the second type to the user; and a network interface module configured to exchange simulated remotely operated machine data for the simulated remotely operated machine of the second type with the simulation computing device over the communications network, the simulated remotely operated machine data formatted in accordance with a second protocol defined by an ICD specific to the second type of simulated remotely operated machine, the simulated remotely operated machine data comprising the digitized instructions. The simulation computing device may be further configured to simulate behaviour of the remotely operated machine of the second type, the processor module computes the images related to the simulated remotely operated machine of the second type considering the digitized instructions, and the network interface module is configured to exchange the simulated remotely operated machine data for the simulated remotely operated machine of the second type with the second simulation station over the communications network in accordance with the universal protocol defined by the universal ICD, the simulated remotely operated machine data comprising the computed images. The protocol gateway may also be located between the second simulation station and the simulation computing device, the network stream definition language file further configuring the protocol gateway to: when receiving the simulated remotely operated machine data from the simulation station via the second protocol, processing the simulated remotely operated machine data in accordance with the universal ICD and transmitting the processed simulated remotely operated machine data to the simulation computing device via the universal protocol; when receiving the simulated remotely operated machine data from the simulation computing device via the universal protocol, processing the simulated remotely operated machine data in accordance with the second protocol and transmitting the processed simulated remotely operated machine data to the simulation station via the second protocol.

In the above-described system, the simulation computing device may receive the simulated remotely operated machine data from each of the first and second simulation stations concurrently, and wherein computing the images for the simulated remotely operated machine of the first type is based in part on the simulated remotely operated machine data for the simulated remotely operated machine of the second type.

In the above-described system, the images for the simulated remotely operated machine of the first type may include a radar image, and wherein the simulated remotely operated machine of the second type is represented on the radar image based on the simulated remotely operated machine data for the simulated remotely operated machine of the second type.

In the above-described system, the images for the simulated remotely operated machine of the first type may include a real-time simulation image, and wherein the simulated remotely operated machine of the second type is represented in the real-time simulation image based on the simulated remotely operated machine data for the simulated remotely operated machine of the second type.

In the above-described system, the instrument module for the simulated remotely operated machine of the second type may be the same as the instrument module for the simulated remotely operated machine of the first type.

In the above-described system, the simulated remotely operated machine data for the simulated remotely operated machine of the first type may be subsequently formatted in accordance with a new version of the first protocol, and the network stream definition language file further configures the protocol gateway to: when receiving the simulated remotely operated machine data from the simulation station via the new version of the first protocol, processing the simulated remotely operated machine data in accordance with the universal ICD and transmitting the processed simulated remotely operated machine data to the simulation computing device via the universal protocol; when receiving the simulated remotely operated machine data from the simulation computing device via the universal protocol, processing the simulated remotely operated machine data in accordance with the new version of the first protocol and transmitting the processed simulated remotely operated machine data to the simulation station via the new version of the first protocol.

In the above-described system, the first protocol and the universal protocol may each define respective read and write ports of the protocol gateway.

In the above-described system, the protocol gateway may be located within the communications network.

In the above-described system, the protocol gateway may be located at the simulation computing device.

The present disclosure further describes a method for processing network stream data for training a user in controlling one or more simulated remotely operated machines. The method comprises receiving simulated remotely operated machine data from a first simulation station, the simulated remotely operated machine data comprising digitized instructions corresponding to commands received from the user by an instrumentation module of the first simulation station, the simulated remotely operated machine data formatted in accordance with a first protocol defined by an Interface Control Document (ICD) specific to the first type of simulated remotely operated machine. The method further comprises identifying, based on the simulated remotely operated machine data being formatted in accordance with the first protocol, that the simulated remotely operated machine data is destined for a simulation computing device. The method further comprises processing the simulated remotely operated machine data in accordance with a universal protocol defined by a universal ICD for the simulation computing device. The method further comprises transmitting the processed simulated remotely operated machine data to the simulation computing device.

The method may further comprise subsequently receiving the simulated remotely operated machine data for the simulated remotely operated machine of the first type from the simulation computing device, the simulated remotely operated machine data comprising computed images related to the simulated remotely operated machine of the first type considering the digitized instructions, the simulated remotely operated machine data formatted in accordance with the universal protocol; identifying, based on the simulated remotely operated machine data being formatted in accordance with the universal protocol, that the simulated remotely operated machine data is destined for the first simulation station; processing the simulated remotely operated machine data in accordance with the first protocol; and transmitting the processed simulated remotely operated machine data to the first simulation station.

The method may further comprise receiving simulated remotely operated machine data for a simulated remotely operated machine of a second type from the simulation computing device, the simulated remotely operated machine data comprising computed images related to the simulated remotely operated machine of the first type considering the digitized instructions, the simulated remotely operated machine data formatted in accordance with the universal protocol; identifying, based on the simulated remotely operated machine data being formatted in accordance with the universal protocol, that the simulated remotely operated machine data is destined for a second simulation station; processing the simulated remotely operated machine data in accordance with a second protocol defined by an ICD specific to the second type of simulated remotely operated machine; and transmitting the processed simulated remotely operated machine data to the second simulation station.

In the above-described method, the computed images for the simulated remotely operated machine of the second type may include a radar image, and wherein the simulated remotely operated machine of the first type is represented on the radar image based on the simulated remotely operated machine data for the simulated remotely operated machine of the first type.

In the above-described method, the computed images for the simulated remotely operated machine of the second type may include a real-time simulation image, and wherein the simulated remotely operated machine of the first type is represented in the real-time simulation image based on the simulated remotely operated machine data for the simulated remotely operated machine of the second type.

The method may further comprise identifying, based on the simulated remotely operated machine data being formatted in accordance with the first protocol, that at least a portion of the simulated remotely operated machine data is destined for a second simulation station associated with a second type of simulated remotely operated machine; processing the simulated remotely operated machine data in accordance with a second protocol defined by an ICD specific to the second type of simulated remotely operated machine; and transmitting the processed simulated remotely operated machine data to the second simulation station.

The method may further comprise subsequently receiving simulated remotely operated machine data from the first simulation station formatted in accordance with a new version of the first protocol; identifying, based on the simulated remotely operated machine data being formatted in accordance with the new version of the first protocol, that the simulated remotely operated machine data is destined for the simulation computing device; processing the simulated remotely operated machine data in accordance with the universal protocol defined by the universal ICD for the simulation computing device; and transmitting the processed simulated remotely operated machine data to the simulation computing device.

The method may further comprise subsequently receiving the simulated remotely operated machine data for the simulated remotely operated machine of the first type from the simulation computing device, the simulated remotely operated machine data comprising computed images related to the simulated remotely operated machine of the first type considering the digitized instructions, the simulated remotely operated machine data formatted in accordance with the universal protocol; identifying, based on the simulated remotely operated machine data being formatted in accordance with the universal protocol, that the simulated remotely operated machine data is destined for the first simulation station; processing the simulated remotely operated machine data in accordance with the new version of the first protocol; and transmitting the processed simulated remotely operated machine data to the first simulation station.

In the above-described method, the simulated remotely operated machine data may be processed based on a predefined network stream definition language file.

In the above-described method, the remotely operated machine data may be received from the first simulation station at a first port of a protocol gateway as defined by the first protocol.

BRIEF DESCRIPTION OF THE DRAWINGS

Further features and advantages of the present disclosure will become apparent from the following detailed description, taken in combination with the appended drawings, in which:

FIG. 4 is an exemplary representation of a network stream definition configuration file.

It will be noted that throughout the appended drawings, like features are identified by like reference numerals.

DETAILED DESCRIPTION

Figure 1:
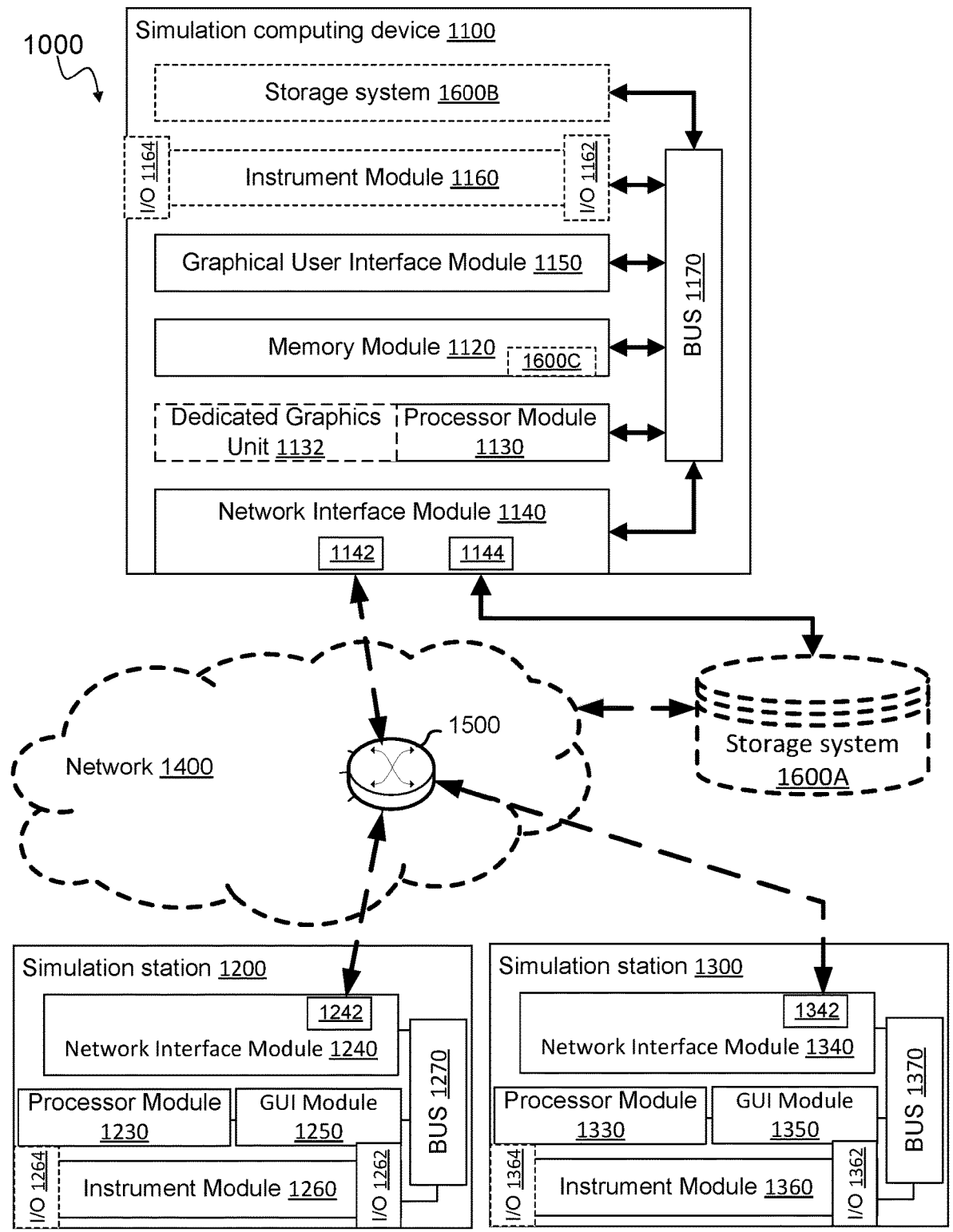
FIG. 1 shows a first logical representation of a system for training a user in controlling one or more simulated remotely operated machines in accordance with the teachings of the present invention.

Simulation of a remotely operated machine requires connecting a simulation computing device to a simulation station (sometimes referred to as ground control station, or "GCS") associated with the remotely operated machine. A user (for example, a pilot, driver, trainee, operator, instructor, etc.) is situated in the simulation station and controls the simulated remotely operated machine using instrumentation associated with the remotely operated machine at the simulation station. The simulated remotely operated machine may comprise an unmanned aerial vehicle (UAV), for example, and the simulation station may have specific instrumentation according to the type of UAV that the user is controlling. Data related to the control of the simulated remotely operated machine is sent from the simulation station to the simulation computing device over a communications network, and simulation data of the remotely operated machine is generated at the simulation computing device in accordance with the received control data. The simulation data may be sent from the simulation computing device over the communications network to the simulation station for display to the user.

Gateways are used to identify and process the data received from the simulation station and simulation computing device and send the converted data to respective of the simulation computing device and simulation station. The simulation station sends/receives data via a protocol defined by an associated Interface Control Document (ICD). The ICD is in general a proprietary document that is specific to each type of simulated remotely operated machine. Accordingly, each time that the simulation computing device is to simulate a new type of remotely operated machine and connect to its associated simulation station, a new protocol gateway must be created based on the new ICD in order to exchange data between the simulation computing device and the simulation station. A new protocol gateway must also be created any time a new version of communication protocol defined by the ICD is created.

Creating a new gateway requires large amounts of time and effort to discuss the communication protocol with the ICD provider, to test the gateway, convert the data to the proper internal unit, etc. Accordingly, systems and methods for training a user to control one or more simulated remotely operated machines that at least partially address the above-noted deficiencies remain highly desirable.

The present disclosure describes systems and methods for training a user to control one or more simulated remotely operated machines that implements a network stream definition language file configured to identify and process simulated remotely operated machine data exchanged between the simulation computing device and a plurality of simulation stations, possibly having many different Interface Control Documents (ICDs).

In accordance with the present disclosure, any exchange of simulated remotely operated machine data between the simulation computing device and a simulation station passes through a protocol gateway that implements the network stream definition language file. The protocol gateway is located at any point of the communication between the simulation computing device and the simulation station, including within the communications network through which the simulated remotely operated machine data is communicated, at the simulation computing device, or at the simulation stations themselves. However, because only one protocol gateway that implements the network stream definition language file can exchange data between the simulation computing device and the plurality of simulation stations, each potentially having respective proprietary ICDs, only a single protocol gateway is necessary within the system.

The network stream definition language file may be implemented as an xml file that describes exactly and precisely how network data should be interpreted, processed, and used. The network stream definition language file primarily defines characteristics of expected network streams formatted in accordance with respective protocols, such as the stream type (xml, binary, etc.), its behaviour (checksum, number of messages, etc.), its network connection type (UDP, TCP, etc.), its update rate (in Hz, seconds, etc.), the location of the checksum, etc. The network stream definition language file also defines exactly how the data is to be processed by specifying storage size, data type, unit (if applicable), particular features (such as 'start of message', 'special processing to do', etc.), and others.

For example, the simulation computing device may be connected to a simulation station that allows a user to be trained on controlling a first type of simulated remotely operated machine. The simulation station may convert control commands received from the user into digitized instructions, and exchange simulated remotely operated machine data including the digitized instructions for the first type of simulated remotely operated machine over the communications network. The simulation station is configured to send/receive simulated remotely operated machine data in accordance with a first protocol, which is defined by an ICD specific to the first type of simulated remotely operated machine. However, the simulation computing device, which is configured to exchange the simulated remotely operated machine data of the first type of simulated remotely operated machine with the simulation station over the communications network, is configured to send/receive the simulated remotely operated machine data in accordance with a different protocol that may not be specific to any type of simulated remotely operated machine, referred to herein as a universal protocol defined by a universal ICD. Accordingly, the protocol gateway exists between the simulation station and the simulation computing device to process the simulated remotely operated machine data in accordance with the protocol of the destination device.

By implementing the network stream definition language file, when the protocol gateway receives the simulated remotely operated machine data from the simulation station via the first protocol that is destined for the simulation computing device, the simulated remotely operated machine data is processed in accordance with the universal ICD and transmitted to the simulation computing device via the universal protocol. When the protocol gateway receives the simulated remotely operated machine data from the simulation computing device via the universal protocol that is destined for the simulation station, the simulated remotely operated machine data is processed in accordance with the first protocol and transmitted to the simulation station via the first protocol.

Moreover, the network stream definition language file allows for the identification and processing of network data in accordance with multiple protocols defined by separate ICDs for different simulated remotely operated machines. Therefore, only one protocol gateway is needed for the simulation computing device to connect with multiple simulation stations for different remotely operated machines. When the simulation computing device is connected to a new simulation station for simulating a new type of remotely operated machine, there is no need to develop a new protocol gateway because the network stream definition language allows for the protocol gateway to adaptively identify and process simulated remotely operated machine data in accordance with the new protocol.

Embodiments are described below, by way of example only, with reference to FIGS. 1-4.

FIG. 1 shows a first logical representation of a system for training a user in controlling one or more simulated remotely operated machines in accordance with the teachings of the present invention. The system for training the user for controlling one or more simulated remotely operated machine is represented in FIG. 1 as interactive computer simulation system 1000. The interactive computer simulation system 1000 comprises a simulation computing device 1100 connected with one or more simulation stations (e.g., a first simulation station 1200 and a second simulation station 1300) over a communications network 1400. The communications network 1400 may be an Ethernet network (e.g., over copper wires) used for conveying Internet Protocol (IP) traffic, with relevant data related to the invention being conveyed over IP using proprietary protocols. Skilled persons will readily recognise that many different physical layers and data link protocols could be used over the network 1400 without affecting the present invention. The actual stack of protocols used on the communications network 1400 below the proprietary protocols used to convey the relevant data can be varied without affecting the present invention. In certain embodiments, one or more proprietary network communications protocol may be used over the communications network 1400, in place of or in addition to conventional network protocols.

The interactive computer simulation system 1000 further comprises a protocol gateway 1500 located between the simulation computing device 1100 and the simulation stations 1200 and 1300. The protocol gateway 1500 is depicted in FIG. 1 as being within the network 1400, however it may also be located at the simulation computing device 1100 or at one or more of the simulation stations 1200 and 1300. The interactive computer simulation system 1000 may further comprise an external storage system 1600A, which may be accessed directly by the simulation computing device 1100 or via the network 1400.

The simulation stations 1200 and 1300 are respectively configured to train a user to control a simulated remotely operated machine associated with the simulation station. The simulation computing device 1100 is configured to generate remotely operated machine simulation data for display to the user at the simulation stations 1200 and 1300. As depicted in FIG. 1, each of the simulation stations 1200, 1300 comprise a processor module 1230, 1330, a network interface module 1240, 1340 comprising one or more ports (represented as a singular port 1242 and 1342), a GUI module 1250, 1350, and an instrument module 1260, 1360 comprising one or more input/output interfaces (represented as internal I/O interfaces 1262, 1362, and external I/O interfaces 1264, 1364, as will be described in more detail herein). The components of the simulation stations, including the processor module 1230, 1330, network interface module 1240, 1340, GUI module 1250, 1350, and instrumentation module 1260, 1360 (through internal I/O interface 1262, 1362) may be electrically connected via bus 1270, 1370, however the present disclosure is not affected by the way the different modules exchange information between them. For instance, some modules could be connected by a parallel bus, but could also be connected by a serial connection or involve an intermediate module without affecting the teachings of the present invention.

The processor module 1230, 1330 may represent a single processor with one or more processor cores or an array of processors, each comprising one or more processor cores. The display screens of the GUI module 1250, 1350 could be split into one or more flat panels, but could also be a single flat or curved screen visible from an expected user position (not shown) in the simulation stations. For instance, the GUI module 1250, 1350 may comprise one or more mounted projectors for projecting images on a curved refracting screen. The curved refracting screen may be located far enough from the user of the interactive computer program to provide a collimated display. Alternatively, the curved refracting screen may provide a non-collimated display. The simulation stations 1200, 1300 may also comprise one or more seats (not shown) or other ergonomically designed tools (not shown) to assist the user of the interactive computer simulation in getting into proper position to gain access to some or all of the instrument module 1260, 1360. The simulation stations 1200 and 1300 may contain various additional components (not shown in FIG. 1), such as a memory module, storage, dedicated graphics unit, etc., as would be readily appreciated by a person skilled in the art.

The simulation stations 1200 and 1300 may exchange simulated remotely operated machine data with one another and with simulation computing device 1100 over the communications network 1400 through the port 1242, 1342 of the network interface module 1240, 1340. For example, the user of the simulation station 1200, 1300 inputs control commands to the instrument module 1260, 1360 for manipulating/controlling a simulated remotely operated machine associated with the simulation station 1200, 1300. The instrument module 1260, 1360 (aided by the processor module 1230, 1330, for example) converts control commands received from the user into digitized instructions destined for the simulation computing device 1100. The digitized instructions may be generated at the instrument module 1260, 1360, passed through the internal I/O interface 1262, 1362 to the network interface module 1240, 1340 via the bus 1270, 1370, and transmitted to the simulation computing device 1100 via the port 1242, 1342. Additionally or alternatively, the digitized instructions may be generated at the instrument module 1260, 1360 and transmitted to the simulation computing device 1100 via the external I/O interface 1264, 1364 directly (not depicted in FIG. 1), where the external I/O interface 1264, 1364 may provide a separate network interface. Irrespective of how the data is sent from the simulation stations 1200, 1300 to the simulation computing device 1100 (i.e. via the port 1242, 1342 or via the external I/O interface 1264, 1364), the simulated remotely operated machine data is formatted in accordance a protocol that is unique to the instrument module 1260, 1360, and is passed through the protocol gateway 1500 before being transmitted to the simulation computing device 1100. The exchange of simulated remotely operated machine data between the simulation stations 1200, 1300 and the simulation computing device 1100 through the protocol gateway 1500 is described in more detail with reference to FIG. 2.

Depending on the type of simulation (e.g., level of immersivity), the tangible instruments may be more or less realistic compared to those that would be available for controlling an actual remotely operated machine. For instance, the tangible instruments provided by the instrument modules 1260, 1360 may replicate an actual remotely operated machine control system where actual instruments found in the controller or physical interfaces having similar physical characteristics are provided to the user (or trainee). As previously described, the actions that the user or trainee takes with one or more of the tangible instruments provided via the instrument modules 1260, 1360 (e.g., modifying lever positions, activating/deactivating switches, etc.) allow the user or trainee to control the virtual simulated element in the interactive computer simulation. In the context of an immersive simulation being performed in the interactive computer simulation system 1000, the instrument module 1260, 1360 would typically support a replicate of an actual instrument panel found in the actual system being the subject of the immersive simulation. While the present disclosure is applicable to immersive simulations (e.g., flight simulators certified for commercial pilot training and/or military pilot training, etc.), skilled persons will readily recognize and be able to apply its teachings to other types of interactive computer simulations (e.g., land and/or marine vehicle simulations).

The instrument module 1260, 1360 may yet also comprise a mechanical instrument actuator (not shown) providing one or more mechanical assemblies for physically moving one or more of the tangible instruments of the instrument module 1260, 1360 (e.g., electric motors, mechanical dampeners, gears, levers, etc.). The mechanical instrument actuator may receive one or more sets of instructions (e.g., from the processor module 1230, 1330) for causing one or more of the instruments to move in accordance with a defined input function. The mechanical instrument actuator of the instrument module 1260, 1360 may also alternatively or in addition be used for providing feedback to the user of the interactive computer simulation through tangible and/or simulated instrument(s) (e.g., touch screens, or replicated elements of an aircraft cockpit or of an operating room). Additional feedback devices may be provided with the simulation stations 1200, 1300 or in the interactive computer simulation system 1000 (e.g., vibration of an instrument, physical movement of a seat of the user and/or physical movement of the whole system, etc.).

The external I/O module 1264, 1364 of the instrument module 1260, 1360 may connect one or more external tangible instruments (not shown) therethrough. The external I/O module 1264, 1364 may be required, for instance, for interfacing the interactive computer simulation system 1000 with one or more tangible instruments identical to an Original Equipment Manufacturer (OEM) part that cannot be integrated into the simulation stations 1200, 1300 (e.g., a tangible instrument exactly as the one that would be found in the actual system subject of the interactive simulation). The internal I/O module 1262, 1362 may comprise necessary interface(s) to exchange data, set data or get data from integrated tangible instruments. The internal I/O module 1262, 1362 may be required, for instance, for interfacing the interactive computer simulation system 1000 with one or more integrated tangible instrument identical to an Original Equipment Manufacturer (OEM) part (e.g., a tangible instrument exactly as the one that would be found in the actual system subject of the interactive simulation).

The simulation computing device 1100 comprises a memory module 1120, a processor module 1130, and a network interface module 1140, similar to the simulation stations 1200 and 1300. In some embodiments, the processor module 1130 may also comprise a dedicated graphics processing unit 1132. The dedicated graphics processing unit 1132 may be required, for instance, when the interactive computer simulation system 1000 performs an immersive simulation (e.g., pilot training-certified flight simulator, tank operator training, driver training, etc.), which requires extensive image generation capabilities (i.e., quality and throughput) to maintain expected realism of such immersive simulation (e.g., between 5 and 120 images rendered per seconds or maximum between 8.3 ms and 200 ms for each rendered image). The simulation stations 1200, 1300 may also comprise a dedicated graphics processing unit (not shown).

The memory module 1120 may comprise various types of memory (different standardized or kinds of Random Access Memory (RAM) modules, memory cards, Read-Only Memory (ROM) modules, programmable ROM, etc.). The network interface module 1140 represents at least one physical interface/port that can be used to communicate with other network nodes. As depicted in FIG. 1, the network interface module 1140 comprises a port 1142 that is used to communicate with the simulation stations 1200 and 1300 via the protocol gateway 1500. The network interface module comprises another port 1144 that may connect with the external storage system 1600A.

The simulation computing device 1100 may also optionally comprise a Graphical User Interface (GUI) module 1150 comprising one or more display screen(s), similar to the GUI modules 1250, 1350 of the simulation stations 1200, 1300. The simulation computing device 1100 may further optionally comprise an instrument module 1160, including internal I/O interface 1162 and external I/O interface 1164, similar to those of the simulation stations 1200, 1300. A bus 1170 is depicted as an example of means for exchanging data between the different modules of the simulation computing device 1100.

The simulation computing device 1100 is configured to simulate behaviour of the remotely operated machines that are being simulated by the simulation stations 1200 and 1300. The network interface module 1140 receives the simulated remotely operated machine data from the simulation stations 1200 and 1300 via the protocol gateway 1500 at port 1142. The processor module 1130 is configured to compute images related to the remotely operated machines associated with the simulation stations 1200 and 1300 considering the digitized instructions received in the respective streams of simulated remotely operated machine data. The simulation computing device 1100 may then send simulated remotely operated machine data comprising the computed images via the network interface module 1140 through port 1142 to the simulation stations 1200 and 1300 over the communications network 1400 and via the protocol gateway 1500.

As further described with reference to FIG. 2, the protocol gateway 1500 implements a network stream definition language file that is used to identify and process data in accordance with various protocols defined by separate Interface Control Documents (ICDs). For example, the first simulation station 1200 may be training a user to control a first type of simulated remotely operated machine. The simulated remotely operated machine data sent/received from the first simulation station is formatted in accordance with a first protocol that is defined by an ICD specific to the first type of simulated remotely operated machine. However, the simulation computing device 1100 may be configured to send/receive simulated remotely operated machine data in accordance with a different protocol, such as a universal protocol defined by a universal ICD that may be used to exchange simulated remotely operated machine data with simulation stations of remotely operated machines of all types. Accordingly, when simulated remotely operated machine data for the first type of simulated remotely operated machine is exchanged between the first simulation station 1200 and the simulation computing device 1100, the protocol gateway 1500 is configured to translate the simulated remotely operated machine data between the first protocol used by the first simulation station 1200 and the universal protocol used by the simulation computing device 1100.

Likewise, the second simulation station 1300 may be training a user to control a second type of simulated remotely operated machine. The simulated remotely operated machine data sent/received from the second simulation station is formatted in accordance with a second protocol that is defined by an ICD specific to the second type of simulated remotely operated machine and thus different than the first protocol. In accordance with the teachings of the present disclosure, a separate protocol gateway is not required for each connection between the simulation computing device 1100 and a simulation station running a new type of simulated remotely operated machine. The protocol gateway 1500 as described herein implements the network stream language file so that the protocol gateway 1500 can also translate the simulated remotely operated machine data for the second type of simulated remotely operated machine between the second protocol used by the simulation station 1300 and the universal protocol used by the simulation computing device 1100, in addition to being able to translate the simulated remotely operated machine data for the first type of simulated remotely operated machine between the first protocol and the second protocol. In additional and/or alternative embodiments, the protocol gateway can also translate the simulated remotely operated machine data between different versions of protocols for the same type of simulated remotely operated machine. Therefore, only one protocol gateway 1500 is required in the interactive computer simulation system 1000, despite the presence of a plurality of simulation stations having different protocols.

In one exemplary application of the interactive computer simulation system 1000, the first and second simulation stations 1200 and 1300 may be associated to the same instance of the interactive computer simulation with a shared computer generated environment where users of the simulation computing device 1100 and stations 1200, 1300 may interact with one another in a single simulation. In accordance with the present disclosure, because the protocol gateway 1500 is implementing network stream definition language files that allows for translation and processing of simulated remotely operated machine data in accordance with the universal protocol used by the simulation computing device 1100 as well as several protocols defined by respective ICDs for different types of remotely operated machines being simulated at simulation stations, the single protocol gateway 1500 can concurrently process simulated remotely operated machine data between the simulation computing device 1100 and both of the simulation stations 1200 and 1300, as well as between the two simulation stations 1200 and 1300 themselves. Accordingly, two different types of remotely operated machines can interact with one another in the simulation environment, via the protocol gateway 1500.

In one example, the simulation computing device 1100 can compute images for display at respective simulation stations 1200 and 1300 that takes into account simulated remotely operated machine data for both types of remotely operated machines being controlled at the simulation stations. For example, radar images can be displayed at the respective simulation stations 1200 and 1300 that each respectively include remotely operated machines of a different type and which is being controlled at the other simulation station. Moreover, real-time simulation images can be generated and displayed at each of the simulation stations 1200 and 1300 that respectively show the remotely operated machine of a different type and which is being simulated at the other simulation station. The capability of using the single protocol gateway 1500 to process data exchanged with simulation stations that are simulating different types of remotely operated machines can thus advantageously allow two different types of remotely operated machines to interact with each other in the simulation, which would have previously been possible only if each simulation station requiring a separate protocol gateway had a dedicated software installed to connect each protocol gateway.

Although FIG. 1 depicts only two simulation stations 1200 and 1300 that have been described as being associated with different types of remotely operated machines and that format simulated remotely operated machine data in accordance with different protocols, or associated with the same type of simulated remotely operated machine and that format simulated remotely operated machine data in accordance with different versions of the same protocol, it will be readily appreciated that the interactive computer simulation system 1000 may comprise a plurality of simulation stations and the protocol gateway 1500 is configured to process data for a plurality of types of remotely operated machines each having simulated remotely operated machine data formatted in accordance with different protocols and/or versions of protocols.

In other embodiments, the single simulation may also involve other simulation computing device(s) (not shown) co-located with the simulation computing device 1100 or remote therefrom. The simulation computing device 1100 and simulation stations 1200, 1300 may also be associated with different instances of the interactive computer simulation, which may further involve other simulation computing device(s) (not shown) co-located with the simulation computing device or remote therefrom.

The tangible instrument provided by the instrument modules 1160, 1260 and/or 1360 are tightly related to the element being simulated. For example, each of the simulation stations 1200 and 1300 may comprise instrument modules 1260 and 1360 that are respectively associated with the type of simulated remotely operated machine being simulated. Alternatively, because the protocol gateway 1500 is configured to process data in accordance with several different protocols, a universal instrument module could be used in the simulation stations 1200, 1300. The universal instrument module would be configured to exchange simulated remotely operated machine data formatted in accordance with a protocol that is specific to the type of remotely operated machine being simulated. When the remotely operated machine being simulated changes, the universal instrument module would format the simulated remotely operated machine data based on the relevant protocol. Since the protocol gateway 1500 is configured to exchange the simulated remotely operated machine data in accordance with several different protocols, a different protocol gateway is not required each time that the type of remotely operated machine changes.

A storage system of the interactive computer simulation system 1000 may log dynamic data in relation to the dynamic sub-systems while the interactive computer simulation is performed. FIG. 1 shows examples of the storage system as a distinct external storage system 1600A, a distinct storage system module 1600B of the simulation computing device 1100, and/or a storage system sub-module 1600C of the memory module 1120 of the simulation computing device 1100. The storage system may also comprise storage modules (not shown) on the simulation stations 1200, 1300. The storage system may be distributed over different storage modules and/or the simulations stations 1200, 1300, or may be in a single system. The storage system may comprise one or more logical or physical interfaces as well as local or remote hard disk drive (HDD) (or an array thereof). The storage system may further comprise a local or remote database made accessible to the computer system 1100 by a standardized or proprietary interface or via the network interface module 1140. The variants of storage system usable in the context of the present invention will be readily apparent to persons skilled in the art.

An Instructor Operating Station (IOS), which is not depicted in FIG. 1, may also be provided for allowing various management tasks to be performed in the interactive computer simulation system 1000. The tasks associated with the IOS allow for control and/or monitoring of one or more ongoing interactive computer simulations. For instance, the IOS may be used for allowing an instructor to participate in the interactive computer simulation and possibly additional interactive computer simulation(s). In some embodiments, the IOS may be provided by the simulation computing device and/or simulation stations. Skilled persons will understand the many instances of the IOS may be concurrently provided in the interactive computer simulation system 1000. The IOS may provide a computer simulation management interface, which may be displayed on a dedicated IOS display module.

The IOS display module may comprise one or more display screens such as a wired or wireless flat screen, a wired or wireless touch-sensitive display, a tablet computer, a portable computer or a smart phone. When multiple simulation computing devices 1100 and/or simulation stations 1200, 1300 are present in the interactive computer simulation system 1000, the IOS may present different views of the computer program management interface (e.g., to manage different aspects therewith) or they may all present the same view thereof. The computer program management interface may be permanently shown on a first of the screens of the IOS display module while a second of the screen of the IOS display module shows a view of the interactive computer simulation (i.e., adapted view considering the second screen from images displayed through the display). The computer program management interface may also be triggered on the IOS, e.g., by a touch gesture and/or an event in the interactive computer program (e.g., milestone reached, unexpected action from the user, or action outside of expected parameters, success or failure of a certain mission, etc.). The computer program management interface may provide access to settings of the interactive computer simulation and/or of the simulation computing device. A virtualized IOS (not shown) may also be provided to the user on the GUI module 1250, 1350 (e.g., on a main screen, on a secondary screen or a dedicated screen thereof). In some embodiments, a Brief and Debrief System (BDS) may also be provided. The BDS may be seen as a version of the IOS used during playback of recorded data only.

In the context of the depicted embodiments, runtime execution, real-time execution or real-time priority processing execution corresponds to operations executed during the interactive computer simulation that may have an impact on the perceived quality of the interactive computer simulation from a user perspective. An operation performed at runtime, in real-time or using real-time priority processing thus typically needs to meet certain performance constraints that may be expressed, for instance, in terms of maximum time, maximum number of frames, and/or maximum number of processing cycles. For instance, in an interactive simulation having a frame rate of 120 frames per second, it is expected that a modification performed within 10 to 20 frames will appear seamless to the user. Likewise, at a frame rate of 60 frames per second, it is expected that a modification performed within 5 to 10 frames will appear seamless to the user. Skilled persons will readily recognize that real-time processing may not actually be achievable in absolutely all circumstances in which rendering images is required. The real-time priority processing required for the purpose of the disclosed embodiments relates to perceived quality of service by the user of the interactive computer simulation, and does not require absolute real-time processing of all dynamic events, even if the user was to perceive a certain level of deterioration of quality of service that would still be considered plausible.

A simulation network (e.g., overlaid on the communications network 1400) may be used, at runtime (e.g., using real-time priority processing or processing priority that the user perceives as real-time), to exchange information (e.g., event-related simulation information). For instance, movements of a remotely operated machine associated to the simulation station 1200, 1300 and events related to interactions of a user of the simulation station 1200, 1300 with the interactive computer generated environment may be shared through the simulation network. Likewise, simulation-wide events (e.g., related to persistent modifications to the interactive computer generated environment, lighting conditions, modified simulated weather, etc.) may be shared through the simulation network from a centralized computer system (not shown). In addition, the storage module (e.g., a networked database system) accessible to all components of the interactive computer simulation system 1000 involved in the interactive computer simulation may be used to store data necessary for rendering an interactive computer generated environment. In some embodiments, the storage module is only updated from a centralized computer system and the simulation computing device 1100 and simulation stations 1200, 1300 only load data therefrom.

Figure 2:
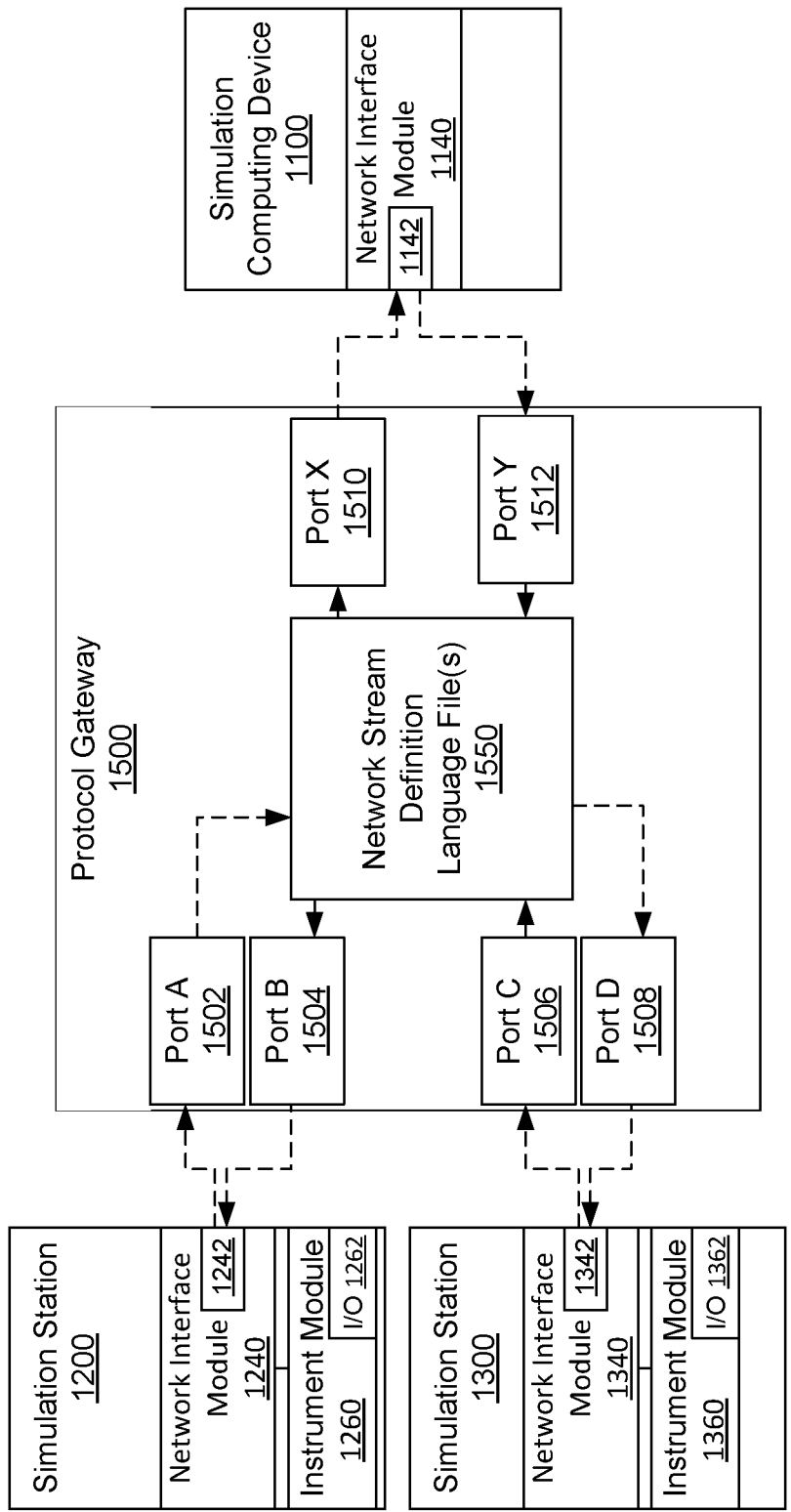
FIG. 2 shows a second logical representation of a system for training a user in controlling one or more simulated remotely operated machines in accordance with the teachings of the present invention.

FIG. 2 shows a second logical representation of a system for training a user in controlling one or more simulated remotely operated machines in accordance with the teachings of the present invention. Particularly, FIG. 2 shows an exemplary flow of the simulated remotely operated machine data between the simulation stations 1200, 1300 and the simulation computing device 1100 through the protocol gateway 1500.

As described with reference to FIG. 1, each of the simulation stations 1200 and 1300 are depicted as comprising a port 1242, 1342 as part of their network interface modules 1240, 1340, through which the simulated remotely operated machine data for the type of simulated remotely operated machine associated with the simulation stations is transmitted and received through. Simulated remotely operated machine data generated at the simulation stations 1200, 1300 may comprise digitized instructions corresponding to user commands received by the instrument module 1260, 1360, for example through the internal I/O module 1262, 1362. Although each simulation station 1200 and 1300 is depicted as comprising only a single port 1242, 1342, such depiction is made for the purpose of clarity only and it would be readily appreciated that the simulation servers 1200 and 1300 would likely comprise several ports through which the simulated remotely operated machine data is transmitted and/or received through.

In the exemplary flow of the simulated remotely operated machine data shown in FIG. 2, the simulation station 1200 is considered to be associated with a first type of simulated remotely operated machine, and the simulated remotely operated machine data sent from/received at the simulation station 1200 is formatted in accordance with a first protocol defined by an ICD specific to the first type of simulated remotely operated machine. The simulation station 1300 is considered to be associated with a second type of simulated remotely operated machine, and the simulated remotely operated machine data sent from/received at the simulation station 1300 is formatted in accordance with a second protocol defined by an ICD specific to the second type of simulated remotely operated machine. Alternatively, the simulation station 1300 may be considered to be associated with the first type of simulated remotely operated machine, and the simulated remotely operated machine data sent from/received at the simulation station 1300 is formatted in accordance with a different version of the first protocol than the version of the protocol used to format the simulated remotely operated machine data for the first simulation station 1200. The simulated remotely operated machine data sent from/received at the simulation computing device 1100 is formatted in accordance with a universal protocol defined by a universal ICD.

In the exemplary representation of FIG. 2, the first protocol defines that the simulation station 1200 transmits the simulated remotely operated machine data for the first type of simulated remotely operated machine to a specified port, Port A 1502, of the protocol gateway 1500. The simulated remotely operated machine data may comprise, for example, digitized instructions corresponding to commands received by a user at the simulation station 1200 for controlling the simulated remotely operated machine. The protocol gateway 1500 reads a network stream definition language file 1550 to determine how to process the simulated remotely operated machine data that is received at Port A 1502. The network stream definition language file 1550 may comprise one or more files specifying how to process the simulated remotely operated machine data received in accordance with one protocol and to transmit the simulated remotely operated machine data in accordance with another protocol. The network stream definition language file 1550 defines that in order to transmit the simulated remotely operated machine data to the simulation computing device 1100, the simulated remotely operated machine data must be transmitted from a specified port, Port X 1510, of the protocol gateway 1500 to the port 1142 of the simulation computing device 1100. The protocol gateway 1500 thus processes the simulated remotely operated machine data accordingly.

The simulation computing device 1100 receives the simulated remotely operated machine data at the appropriate port 1142 and in the correct format as specified by the universal ICD. The simulation computing device 1100 may process the simulated remotely operated machine data to provide simulation information to the simulation station 1200. For example, the simulation computing device 1100 may compute images related to the simulated remotely operated machine associated with the simulation station 1200 based on the digitized instructions. In accordance with the universal protocol, the simulation computing device 1100 transmits the simulated remotely operated machine data comprising the computed images to a specified port, Port Y 1512, of the protocol gateway 1500. The protocol gateway 1500 reads the network stream definition language file 1550 to determine how to process the simulated remotely operated machine data that is received at Port Y 1512 and destined for the first simulation station 1200. The network stream definition file 4000 defines that in order to transmit the simulated remotely operated machine data to the simulation station 1200, the simulated remotely operated machine data must be transmitted from a specified port, Port B 1504, of the protocol gateway 1500 to the port 1242 of the simulation station 1200. The protocol gateway 1500 thus processes the simulated remotely operated machine data accordingly.

As has been previously described, the network stream definition language file 1550 of the protocol gateway 1500 permits for the exchange of simulated remotely operated machine data between simulation computing device 1100 and multiple simulation stations. A similar processing of simulated remotely operated machine data as described with reference to the first simulation station 1200 can also be performed for the second simulation station 1300 using the protocol gateway 1500, except that the second simulation station 1300 formats its simulated remotely operated machine data in accordance with a different protocol than that which is used by the first simulation station (i.e., the protocols are different because the first and second simulation stations 1200 and 1300 are associated with different types of remotely operated machines, or because the first and second simulation stations 1200 and 1300 exchange data with different version of the same protocol). Accordingly, as depicted in FIG. 2 instead of the second simulation station 1300 transmitting simulated remotely operated machine data to Port A 1502 and receiving simulated remotely operated machine data from Port B 1504, the second simulation station 1300 instead transmits the simulated remotely operated machine data to Port C 1506, and receives data from Port D 1508.

In further embodiments, simulated remotely operated machine data from respective of the simulation stations 1200, 1300 may also be exchanged with one another. For example, the first simulation station 1200 may send simulated remotely operated machine data for the first type of simulated remotely operated machine to the second simulation station 1300. The simulated remotely operated machine data for the first type of simulated remotely operated machine is sent from the port 1242 to Port A 1502 of the protocol gateway 1500 in accordance with the first protocol. The protocol gateway 1500 reads the network stream definition language file 1550, which defines that the simulated remotely operated machine data destined for the second simulation station 1300 should be processed in accordance with the second protocol. The simulated remotely operated machine data for the first type of simulated remotely operated machine is sent from Port D 1508 of the protocol gateway 1500 to the port 1342 of the second simulation station 1300 in accordance with the second protocol. Simulated remotely operated machine data for the second type of simulated remotely operated machine generated at the second simulation station 1300 may be transmitted to the first simulation station 1200 in a similar manner.

The above description of the flow of the simulated remotely operated machine data between the simulation stations 1200, 1300 and the simulation computing device 1100 through the protocol gateway 1500 has been simplified for the purpose of clarity. For example, a person skilled in the art will readily appreciate that the protocol gateway 1500 may be connected to a plurality of simulation stations, each having a plurality of ports, and that the protocols are often more complex than what is described.

Figure 3:
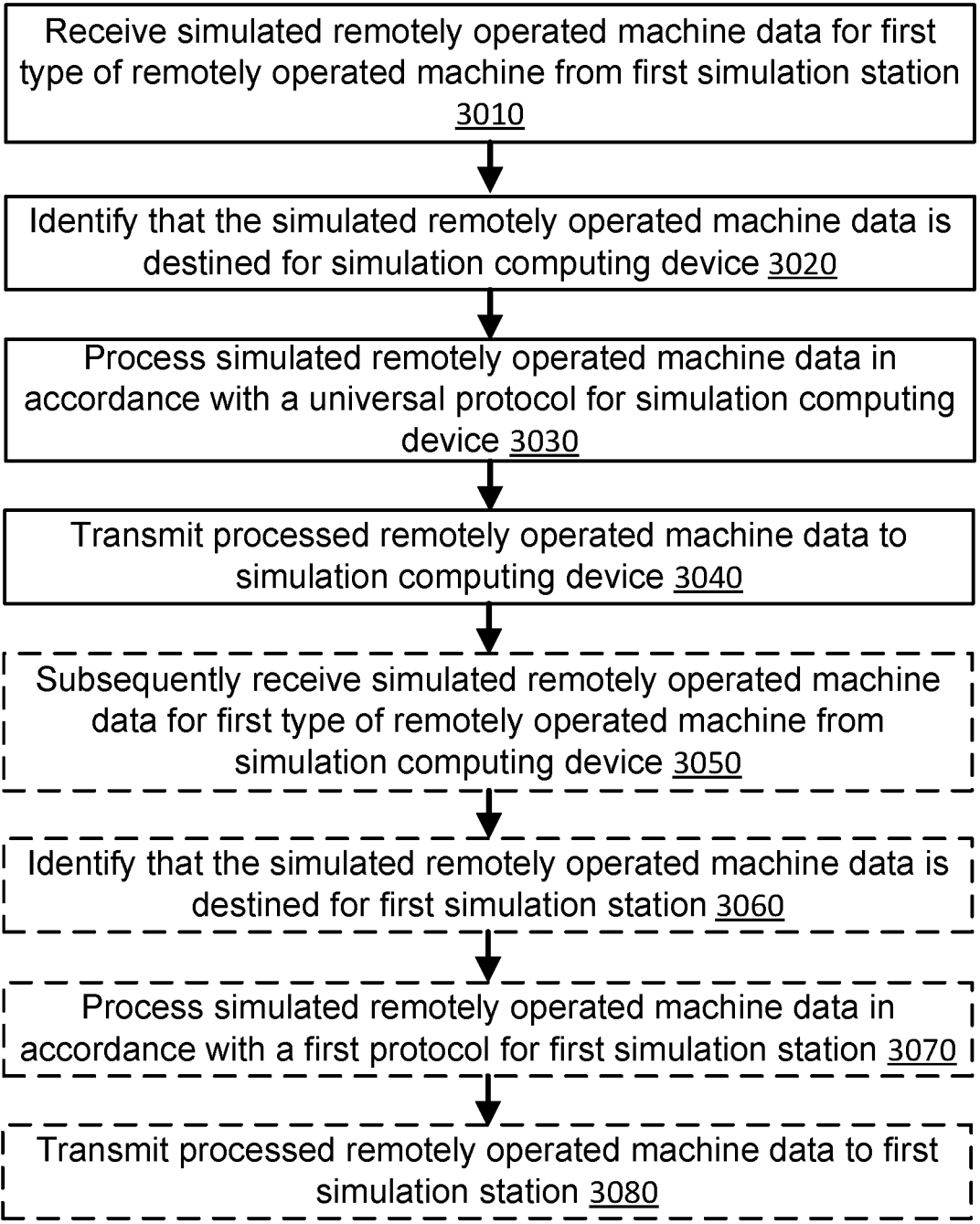
FIG. 3 shows an exemplary method for processing network stream data for training a user in controlling one or more simulated remotely operated machines in accordance with the teachings of the present invention.

FIG. 3 shows an exemplary method 3000 for processing network stream data for training a user in controlling one or more simulated remotely operated machines in accordance with the teachings of the present invention. The method 3000 may be performed, for example, by one or more hardware elements (e.g., a processor or a distributed network of processors similar to the processor module 1130, etc.) that provide the protocol gateway 1500. The method 3000 may be encompassed as computer-readable instructions stored on a non-transitory computer readable medium that configure a processor or other computing device to perform the method 3000.

In the method 3000 for processing network stream data, simulated remotely operated machine data for a first type of simulated remotely operated machine is received from a first simulation station (3010). The simulated remotely operated machine data for the first type of simulated remotely operated machine may comprise digitized instructions corresponding to user commands received at an instrument module of the first simulation station. The simulated remotely operated machine data for the first type of simulated remotely operated machine may be formatted in accordance with a first protocol specified by an ICD specific to the first type of simulated remotely operated machine. The simulated remotely operated machine data may be received at a specified port of the protocol gateway, for example, and transmitted from a specified port of the first simulation station.

It is identified that the simulated remotely operated machine data received from the first simulation station is destined for the simulation computing device (3020). This identification/determination of the destination of the simulated remotely operated machine data may be made based on the content of the simulated remotely operated machine data and/or based on how the simulated remotely operated machine data has been formatted in accordance with the first protocol. For example, based on a determination of a check sum location or other characteristic feature in the network stream of simulated remotely operated machine data, it may be identified that the simulated remotely operated machine data is formatted in accordance with the first protocol. That the simulated remotely operated machine data is destined for the simulation computing device may be determined based on the port that the simulated remotely operated machine data was received at, as defined by the first protocol. Additionally or alternatively, the destination may be specified within the simulated remotely operated machine data, such as in a packet header.

The simulated remotely operated machine data for the first type of simulated remotely operated machine is processed in accordance with a universal protocol used by the simulation computing device (3030). More particularly, by having identified that the simulated remotely operated machine data is destined for the simulation computing device, the protocol used by the simulation computing device may be determined to be the universal protocol. The processed simulated remotely operated machine data is transmitted to the simulation computing device in accordance with the universal protocol (3040).

The method 3000 for processing network stream data may further comprise subsequently receiving simulated remotely operated machine data for the first type of simulated remotely operated machine from the simulation computing device (3050). The simulated remotely operated machine data for the first type of simulated remotely operated machine received from the simulation computing device may comprise, for example, images for simulating the first type of simulated remotely operated machine at the first simulation station based on the digitized instructions received from the first simulation station. The simulated remotely operated machine data received from the simulation computing device is formatted in accordance with the universal protocol.

It is identified that the simulated remotely operated machine data received from the simulation computing device is destined for the first simulation station (3060). This identification/determination of the destination of the simulated remotely operated machine data may be made based on the content of the simulated remotely operated machine data and/or based on how the simulated remotely operated machine data has been formatted in accordance with the universal protocol. The simulated remotely operated machine data for the first type of simulated remotely operated machine is processed in accordance with the first protocol used by the first simulation station (3070). More particularly, by having identified that the simulated remotely operated machine data is destined for the first simulation station, the protocol used by the first simulation station may be determined to be the first protocol. The processed simulated remotely operated machine data is transmitted to the first simulation station in accordance with the first protocol (3080).

The method 3000 depicted in FIG. 3 for processing network stream data represents just one embodiment of the present disclosure, and modifications to and alternatives of the method 3000 may be made without departing from the scope of this disclosure. As described above, a person skilled in the art will readily appreciate that the method 3000 may additionally or alternatively include receiving simulated remotely operated machine data for a second type of simulated remotely operated machine from the simulation computing device, the simulated remotely operated machine data for the second type of simulated remotely operated machine based on the simulated remotely operated machine data for the first type of simulated remotely operated machine. Further, instead of or in addition to the simulated remotely operated machine data received from the first simulation station being identified as destined for the simulation computing device, the simulated remotely operated machine data received from the first simulation may be identified as destined for a second simulation station.

FIG. 4 is an exemplary representation of a network stream definition configuration file 4000. The network stream definition configuration file 4000 may be used to generate the network stream definition language file(s) 1550 implemented by the protocol gateway 1500 for processing of network stream data in accordance with a plurality of protocols.

The network stream definition configuration file 4000 may be an XSD xml file that outlines how the network stream definition language file 1550 is to be constructed. As depicted in FIG. 4, the network stream definition language contains the following segments:

NetworkStreamDefinition
    Enumeration_Segment
    Structure_Segment
    XmlElement
    BinaryElement
    Header_Segment
    XmlElement
    BinaryElement
    Footer_Segment
    BinaryElement
    XmlRoot_Segment
    XmlAttribute
    OutgoingPacket_Segment
    XmlRootAttribute
    XmlElementGroup
    BinaryElement
    IncomingPacket_Segment
    XmlRootAttribute
    XmlElementGroup
    BinaryElement Each segment has their attributes defined as follows:
NetworkStreamDefinition Attributes:
    Note
    StreamType
    Epoch
    MaximumNbOfDataBlock
    ChecksumContext
    Checksum Method
    UpdateRateInHz
    UpdateIntervalInSec
    Checksum Location
Enumeration_Segment Attributes:
    Name
    ValueType
    StorageType
    EnumerationIntialValue
Structure_Segment Attributes:
    Name
Header_Segment Attributes:
    Name
    ComponentType
XmlRoot_Segment Attributes:
    Name
Footer_Segment Attributes:
    Name
    ComponentType
OutgoingPacket_Segment Attributes:
    IsAnXmlRoot
    XmlName
    Note
    Luid
    AcknowledgeRequired
    UpdateKind
    MemberOf
IncomingPacket_Segment Attributes:
    IsAnXmlRoot
    XmlName
    Name
    Luid
    AcknowledgeRequired
    ValidIf By using the network stream definition configuration file 4000 to construct the network stream definition language file 1550 in accordance with the above segments and segment attributes, the characteristics of the network stream such as stream type (xml, binary, etc.), its behaviour (checksum, number of messages, etc.), its network connection type (UDP, TCP, etc.), its update rate (in Hz, seconds, etc.), the location of the checksum, etc., is defined. The network stream definition configuration file 4000 also defines for the network stream definition language file 1550 exactly how the simulated remotely operated machine data is to be processed by specifying storage size, data type, unit (if applicable), particular features (such as 'start of message', 'special processing to do', etc.), and others.

The network stream definition configuration file 4000 thus allows for creating network stream definition language files 1550 configured for the protocol of an incoming stream of simulated remotely operated machine data from a simulation station to be identified and the simulated remotely operated machine data to be processed in accordance with a protocol of a destination device, as has been previously described. The network stream definition language file 1550, when implemented by the protocol gateway 1500, allows for adaptable capabilities of exchanging simulated remotely operated machine data formatted in accordance with various protocols, and furthermore requires only a single protocol gateway 1500 that can be used each time that the simulation computing device is connected to new simulation stations.

After creating a network stream definition language file 1550 using the network stream definition configuration file 4000 and prior to implementing the network stream definition language file 1550 at the protocol gateway, additional validation of the network stream definition language file 1550 may be performed. Validating the network stream definition language file 1550 may use a validation file, which may also be an XSD file. The validation is performed for the purpose of identifying potential errors therein that may prevent appropriate processing of the simulated remotely operated machine data for the remotely operated machines being simulated, such as locating formatting problems, ensuring that all mandatory parameters are mapped, etc.

In further embodiments, the protocol gateway 1500 may also be configured to identify the incoming simulated remotely operated machine data in a high-level architecture and write to the network stream definition configuration file 4000 to create/modify a network stream definition language file 1550 and determine how to process simulated remotely operated machine data received.

It is envisioned that companies which create remotely operated machines and associated ground control stations/simulation stations can use the network stream definition language to describe their proprietary ICDs. Using the network stream definition language to describe proprietary ICDs can minimize the amount of time that the integration of a simulation station with a simulation computing device takes and reduces the number of interpretation errors.

It would be appreciated by one of ordinary skill in the art that the system and components shown in FIGS. 1-4 may include components not shown in the drawings. For instance, the memory module and the processor module could be connected by a parallel bus, but could also be connected by a serial connection or involve an intermediate module (not shown) without affecting the teachings of the present invention. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

The invention claimed is:

1. A system for processing network stream data for simulation stations, comprising:
   one or more processors configured to:
   receive first simulation data from a first simulation station, the first simulation data comprising digitized instructions corresponding to commands received from a first user by an instrumentation module of the first simulation station, the first simulation data formatted in accordance with a first protocol according to a first simulated machine associated with the instrumentation module of the first simulation station;
   receive second simulation data from a second simulation station, the second simulation data comprising digitized instructions corresponding to commands received from a second user by an instrumentation module of the second simulation station, the second simulation data formatted in accordance with a second protocol according to a second simulated machine associated with the instrumentation module of the second simulation station;
   identify that the first and second simulation data is destined for a simulation computing device;
   translate the format of the first and second simulation data in accordance with a third protocol used by the simulation computing device; and
   transmit the translated first and second simulation data to the simulation computing device.

2. The system of claim 1, wherein the one or more processors are further configured to:
   subsequently receive simulation image data for the first and second simulation stations, the simulation image data comprising computed images related to the first and second simulated machines considering the first and second simulation data, the simulation image data formatted in accordance with the third protocol;
   identify that a first subset of the simulation image data is destined for the first simulation station, and that a second subset of the simulation image data is destined for the second simulation station;
   translate the format of the first subset of the simulation image data in accordance with the first protocol;
   translate the format of the second subset of the simulation image data in accordance with the second protocol; and
   transmit the translated first and second subsets of the simulation image data to the first and second simulation stations, respectively.

3. The system of claim 2, wherein the second subset of the simulation image data comprises computed images related to the first simulated machine considering the first simulation data.

4. The system of claim 3, wherein the second subset of the simulation image data includes a radar image, and wherein the first simulated machine is represented on the radar image based on the first simulation data.

5. The system of claim 3, wherein the second subset of the simulation image data includes a real-time simulation image, and wherein the first simulated machine is represented in the real-time simulation image based on the second simulation data.

6. The system of claim 2, wherein the one or more processors are configured to:
identifying that at least a portion of the first simulation data is destined for the second simulation station;
translating the format of the portion of the first simulation data in accordance with the second protocol; and
transmitting the translated portion of the first simulation data to the second simulation station.

7. The system of claim 1, wherein the first and second simulation data, and the simulation image data, is translated in accordance with the first, second, and third protocols based on a predefined network stream definition languae file that defines characteristics of data streams formatted in accordance with respective protocols.

8. The system of claim 1, wherein the one or more processors identifies that the first and second simulation data is destined for the simulation computing device based on at least one of: a port that the respective first and second simulation data is received at, and destination information specified within the respective first and second simulation data.

9. A method for processing network stream data for simulation stations, comprising:
receiving first simulation data from a first simulation station, the first simulation data comprising digitized instructions corresponding to commands received from a first user by an instrumentation module of the first simulation station, the first simulation data formatted in accordance with a first protocol according to a first simulated machine associated with the instrumentation module of the first simulation station;
receiving second simulation data from a second simulation station, the second simulation data comprising digitized instructions corresponding to commands received from a second user by an instrumentation module of the second simulation station, the second simulation data formatted in accordance with a second protocol according to a second simulated machine associated with the instrumentation module of the second simulation station;
identifying that the first and second simulation data is destined for a simulation computing device;
translating the format of the first and second simulation data in accordance with a third protocol used by the simulation computing device; and
transmitting the translated first and second simulation data to the simulation computing device.

10. The method of claim 9, further comprising:
subsequently receiving simulation image data for the first and second simulation stations, the simulation image data comprising computed images related to the first and second simulated machines considering the first and second simulation data, the simulation image data formatted in accordance with the third protocol;
identifying that a first subset of the simulation image data is destined for the first simulation station, and that a second subset of the simulation image data is destined for the second simulation station;
translating the format of the first subset of the simulation image data in accordance with the first protocol;
translating the format of the second subset of the simulation image data in accordance with the second protocol; and
transmitting the translated first and second subsets of the simulation image data to the first and second simulation stations, respectively.

11. The method of claim 10, wherein:
the second subset of the simulation image data comprises computed images related to the first simulated machine considering the first simulation data.

12. The method of claim 11, wherein the second subset of the simulation image data includes a radar image, and wherein the first simulated machine is represented on the radar image based on the first.

13. The method of claim 11, wherein the second subset of the simulation image data includes a real-time simulation image, and wherein the first simulated machine is represented in the real-time simulation image based on the second simulation data.

14. The method of claim 9, further comprising:
identifying that at least a portion of the first simulation data is destined for the second simulation station;
translating the format of the portion of the first simulation data in accordance with the second protocol; and
transmitting the translated portion of the first simulation data to the second simulation station.

15. The method of claim 9, wherein the first and second simulation data, and the simulation image data, is translated in accordance with the first, second, and third protocols based on a predefined network stream definition language file that defines characteristics of data streams formatted in accordance with respective protocols.

16. The method of claim 9, wherein identifying that the first and second simulation data is destined for the simulation computing device is made based on at least one of: a port that the respective first and second simulation data is received at, and destination information specified within the respective first and second simulation data.

17. The method of claim 9, wherein one of the first and second protocol is the same as the third protocol.

18. The method of claim 9, wherein each of the first, second, and third protocols are each associated with different interface specifications.

19. The method of claim 9, wherein the second protocol is a different version of the first protocol.

20. A non-transitory computer-readable medium having computer-readable instructions in code which, when executed by a processor, cause a computing system to process network stream data for simulation stations by:
receiving first simulation data from a first simulation station, the first simulation data comprising digitized instructions corresponding to commands received from a first user by an instrumentation module of the first simulation station, the first simulation data formatted in accordance with a first protocol according to a first simulated machine associated with the instrumentation module of the first simulation station;
receiving second simulation data from a second simulation station, the second simulation data comprising digitized instructions corresponding to commands received from a second user by an instrumentation module of the second simulation station, the second simulation data formatted in accordance with a second protocol according to a second simulated machine associated with the instrumentation module of the second simulation station;
identifying that the first and second simulation data is destined for a simulation computing device;
translating the format of the first and second simulation data in accordance with a third protocol used by the simulation computing device; and transmitting the translated first and second simulation data to the simulation computing device.

\* \* \* \* \*